United States Patent
Benoit

(10) Patent No.: US 7,174,016 B2
(45) Date of Patent: Feb. 6, 2007

(54) MODULAR EXPONENTIATION ALGORITHM IN AN ELECTRONIC COMPONENT USING A PUBLIC KEY ENCRYPTION ALGORITHM

(75) Inventor: Olivier Benoit, Quebec (CA)

(73) Assignee: Gemplus, Gemenos (FR)

( * ) Notice: Subject to any disclaimer, the term of this patent is extended or adjusted under 35 U.S.C. 154(b) by 716 days.

(21) Appl. No.: 10/181,890

(22) PCT Filed: Jan. 18, 2001

(86) PCT No.: PCT/FR01/00166

§ 371 (c)(1),
(2), (4) Date: Sep. 18, 2002

(87) PCT Pub. No.: WO01/55838

PCT Pub. Date: Aug. 2, 2001

(65) Prior Publication Data

US 2003/0053621 A1 Mar. 20, 2003

(30) Foreign Application Priority Data

Jan. 26, 2000 (FR) .................................. 00 01333

(51) Int. Cl.
*H04L 9/30* (2006.01)

(52) U.S. Cl. .......................... 380/30; 380/255; 713/174
(58) Field of Classification Search .................. 380/30, 380/44, 255; 713/174
See application file for complete search history.

(56) References Cited

U.S. PATENT DOCUMENTS 6,064,740 A * 5/2000 Curiger et al. ............... 380/265
6,298,442 B1 * 10/2001 Kocher et al. ............... 713/194

OTHER PUBLICATIONS

Kocher, P., et al., *Differential Power Analysis*, Lecture Notes in Computer Science, vol. 1666, 1999, pp. 388-397.
Messerges, T., et al., *Power Analysis Attacks of Modular Exponentiation in Smartcards*, Lecture Notes in Computer Science, vol. 1717, 1999, pp. 144-157.

* cited by examiner

*Primary Examiner*—Emmanuel L. Moise
*Assistant Examiner*—Jeffrey Popham
(74) *Attorney, Agent, or Firm*—Buchanan Ingersoll & Rooney, PC

(57) ABSTRACT

The present invention concerns an anti-SPA modular exponentiation algorithm in an electronic component using a public key ciphering algorithm. A pair of registers and an indicator are used to provide symmetrical processing of bits in the algorithm, so that the values of individual bits cannot be determined from power consumption.

8 Claims, No Drawings

MODULAR EXPONENTIATION ALGORITHM IN AN ELECTRONIC COMPONENT USING A PUBLIC KEY ENCRYPTION ALGORITHM

This disclosure is based upon French Application No. 00/01333, filed on Jan. 26, 2000 and International Application No. PCT/FR01/00166, filed Jan. 18, 2001, the contents of which are incorporated herein by reference.

BACKGROUND OF THE INVENTION

The present invention concerns an anti-SPA ("Simple Power Attack") modular exponentiation algorithm in an electronic component using a public key ciphering algorithm.

The characteristics of public key cryptography algorithms are known: calculations made, parameters used. The only unknown is the private key contained in the program memory of an electronic component, such as a smart card. The entire security of these cryptography algorithms resides in this private key contained in the card and unknown to the world outside this card. This private key cannot be deduced solely from knowledge of the message applied as an input and the encoded message supplied in return or from knowledge of the public key.

However, it has become clear that external attacks, based on the current consumptions or an analysis of current consumption when the microprocessor in a card is in the process of running the cryptography algorithm for signing a message or deciphering a message, enable ill-intentioned third parties to find the private key contained in this card. These attacks are referred to as SPA attacks, the English acronym for Single Power Analysis.

The principle of these SPA attacks is based on the fact that the current consumption of the microprocessor executing the instructions varies according to the data manipulated.

In particular, when an instruction executed by the microprocessor requires manipulation of a data item bit by bit, there are two different current profiles depending on whether this bit is "1" or "0". Typically, if the microprocessor manipulates a "0", there is at this moment of execution a first consumed current amplitude and if the microprocessor manipulates a "1" there is a second consumed current amplitude different from the first.

Thus the SPA attack exploits the difference in the current consumption profile in the card during the execution of an instruction according to the value of the bit manipulated. In a simplified manner, the conduct of an SPA attack consists of identifying one or more particular periods during which the algorithm is run comprising the execution of at least one instruction manipulating data bit by bit and distinguishing two different current consumption profiles, one corresponding to the manipulation of a bit equal to "0" and the other corresponding to a bit equal to "1". The analysis takes place over a curve or possibly over n curves of the same running of the algorithm averaged in order to eliminate noise.

Modular exponentiation is defined by the following mathematical formula:

$$R = X^Y \bmod N,$$

in which:
Y is an exponent which has a size of k bits;
N is a modulus which has a size of k' bits;
X is a known variable which has a size of k" bits;
R is the result of the modular exponentiation operation and has a size of k' bits.

The known conventional algorithms A or B described below can be used.

The conventional algorithm A used for calculating the above mentioned mathematical formula is as follows:
R is initialised to 1: R=1;
The binary representation of Y is run through from the most significant bit denoted Y(k−1) to the least significant bit Y(0);
for each bit Y(i), i varying from (k−1) to 0, the additional operation $R=R^2$ is performed.
If the bit Y(i) is equal to 1, an additional step is executed which consists of the operation:

$$R = R * X.$$

If for example Y is equal to 5, its binary representation is 101;
If the above algorithm is applied:
for the first bit [Y(2)=1], $R=R^2$ is effected followed by the operation R=R*X, that is to say the result, R=X;
for the second bit [Y(1)=0], the operation $R=R^2$ is performed, that is to say the result, $R=X^2$;
for the third bit [Y(0)=1], the operation $R=R^2$ is performed, followed by the operation R=R*X, that is to say the result, $R=(X^2)^2*X=X^5$.
As a reminder, the previous R is always used.

Naturally, all the mathematical operations described for the example Y is equal to 5 are performed modulo N, which makes it possible to work with a register r with a size of k' bits.

The conventional algorithm B used for calculating the abovementioned mathematical formula is as follows:
R is initialised to 1 and Z to X:
R=1 and Z=X, Z being a variable:
the binary representation of Y is run through from the least significant bit Y(0) to the most significant bit Y(k−1);
for each bit Y(i), i varying from 0 to (k−1), the additional operation $Z=Z^2$ is performed, when i is greater than 0;
if the bit Y(i) is equal to 1, an additional step is executed which consists of the operation:

$$R = R * Z.$$

If for example Y is equal to 5, its binary representation is 101.
If the above algorithm is applied:
for the first bit, Y(0)=1; the operation $Z=Z^2$ is not performed (since i=0) and the operation R=R*Z=X is performed;
for the second bit [Y(1)]=0, the operation $Z=Z^2=X^2$ is performed; R is unchanged since Y(1)=0;
for the third bit [Y(2)=1], the operation $Z=Z^2=X^4$ is performed and as Y(2) is equal to 1 the operation R=R*Z is also performed and therefore $X^5$ is obtained.
As a reminder, the previous R and Z are always used.

Naturally, all the mathematical operations described for the example Y is equal to 5 are performed modulo N, which makes it possible to work with registers r and z with a size of k' bits.

However, this algorithm B is rarely used in an electronic component of the chip card type since it requires more memory (an additional register z with a size of k' bits).

It is found that, on the conventional algorithms A and B explained above, according to each bit of Y one operation is performed if the bit is 0 and two operations if the bit is 1. These algorithms A and B are used for the RSA. As a reminder, the RSA ciphering system is the most widely used public key ciphering system. It can be used as an ciphering method or as a signature method. The RSA ciphering system is used in chip cards for certain applications thereof. The possible applications of RSA on a chip card are access to data banks, banking applications, distance payment applications, such as for example pay television, petrol dispensing or the payment of motorway tolls. This list of applications is of course not exhaustive.

The principle of the RSA ciphering system is as follows. It can be divided into three distinct parts, namely:

1) The generation of the pair of RSA keys;
2) The ciphering of a message in clear into a ciphered message, and
3) The deciphering of a ciphered message into a message in clear.

The RSA ciphering operation consists of calculating a cipher c which is equal to a message $M^e$ mod N represented by the operation $C=M^e$ mod N, in which e is the public ciphering exponent and N is the modulus.

An RSA deciphering operation consists of calculating a message M' which is equal to M if the deciphering is carried out correctly and is represented by the operation:

$$M'=C^d \text{ mod } N,$$

in which d is the private deciphering exponent and N the modulus.

It is found that the RSA is directly a modular exponentiation operation.

It turns out that d is an element which is secret since it is private; it is therefore found that d is equivalent to Y in the conventional algorithm A or B, algorithms described at the beginning of the description. However, these algorithms used for the RSA can be attacked simply by studying the current consumption of the electronic component implementing the invention.

This is because, if it is considered that the signature S of an operation $R^2$ for algorithm A and $Z^2$ for algorithm B referred to as "operation square", denoted S(SQU), is different from the signature S of the operation R*X for algorithm A and Z*R for algorithm B, referred to as "operation multiply", denoted S(MUL), then the current consumption during the execution of the algorithm A or B described above consists of a series of signatures S(SQU) and S(MUL) directly dependent on Y.

For example, in the case of algorithm A, for Y equal to 5, there will be the following series of signatures:

[S(SQU), S(MUL)], [S(SQU)], [S(SQU), S(MUL)], in which series the signatures [S(SQU)] followed by [S(MUL)] corresponds to a bit equal to 1 and the signature [S(SQU)] followed by the signature [S(SQU)] corresponds to a bit equal to 0.

Simply by looking at the current consumption, if it is known how to differentiate S(SQU) from S(MUL), it is possible to find the whole of the value Y. If this attack is applied to the RSA described above, Y=d is found, which is the private deciphering exponent which must remain secret by definition, which is therefore very awkward.

The present invention makes it possible to eliminate this major drawback.

However, in order to clearly emphasise the inventiveness of the present invention, it is useful to describe an example of an improvement to the algorithms A and B which are nevertheless faulty.

In the conventional algorithm A or B, it is considered that the component which implements the invention has an optimised operation referred to as "Square", denoted SQU, which calculates $R^2$ more effectively than the operation "Multiply", denoted MUL.

The first riposte against attack consists of using only the operation MUL. In this case, there remains nothing more than the signature of the operation "Multiply", which no longer makes it possible to distinguish any information making it possible to go back to the value Y. More precisely, the mathematical operation "Multiply" has two operands V and W and is defined by the formula:

$$MUL(V,W)=V*W.$$

In theory, one is protected but in practice the operation MUL(V,V) or the operation MUL(V,W) is used; there is therefore still a difference in the current consumption since the operands are different. This is not a reliable solution.

DESCRIPTION OF THE INVENTION

The algorithm of the invention when used with algorithm A consists of the following initialisation steps a and b and the calculation steps c, d, e and f which are performed k times, k being the size of Y:

a) $R_1=1$ is initialised;
b) I=0 is initialised.

The present invention consists of calculating the modular exponentiation by means of the present algorithm and makes it possible to avoid the drawback cited just above.

Use is made of two registers $R_1$ and $R_2$ and an indicator I which is equal to zero, "0", meaning that the result is situated in the register $R_1$ or which is equal to a one, "1", meaning that the result is situated in the register $R_2$; this makes it possible to indicate in which register the correct result is situated.

The algorithm of the invention which uses algorithm A consists of being executed by means of the following initialisation steps a and b and the calculation steps c, d, e and f which are performed k times, k being the size of Y, steps described below:

a) $R_1=1$ is initialised;
b) I=0 is initialised.

For each bit Y(i) of the binary representation of Y, the following four steps c, d, e and f of "0" to "k−1" are performed; the binary representation of Y is run through from the most significant bit Y(k−1) to the least significant bit Y(0);

c) If I=0, the operation $R_2=(R_1)^2$ is performed;
If I=1, the operation $R_1=(R_2)^2$ is performed;
d) I is complemented, that is to say it changes value but only from "0" to "1" or from "1" to "0";
e) The test operation is repeated on I:
If I=0, the operation $R_2=R_1*X$ is performed;
If I=1, the operation $R_1=R_2*X$ is performed;
f) If Y(i) is equal to 1, then I is complemented; if Y(i) is equal to 0, then I is kept unchanged.

Thus, whatever the value of Y, an SQU operation and an MUL operation are always performed. There will therefore be, at step d, one of the following two signatures:

$$S(R_2=SQU(R_1)) \text{ or } S(R_1=SQU(R_2))$$

There will also be, at step f, one of the following two signatures: $S(R_1=MUL(R_2,X))$ or $S(R_2=MUL(R_1,X))$.

The signatures of step c are equivalent since they use the same operands and perform the same operation (SQU).

The signatures of step e are equivalent since they use the same operands and perform the same operation (MUL).

Consequently it is no longer possible to go back to the value of Y, which will be a succession of operations (SQU) and (MUL) The application of the present invention makes it possible to calculate a modular exponentiation in a protected fashion in an electronic component using a public key algorithm requiring a modular exponentiation algorithm.

The algorithm of the present invention, when applied to the conventional algorithm B, consists of the following initialisation steps a and b and the following calculation steps c, d and e, which are carried out k times, k being the size of Y:

a) $R_1=1$ is initialised and $Z=X$;
b) $I=0$ is initialised.

For each bit of Y(i) of the binary representation of Y, the three steps c, d and e are performed, i varying from "0" to "k−1"; the binary representation of Y is run through from the least significant bit Y(0) to the most significant bit Y(k−1);

c) the operation $Z:=Z^2$ is performed;
d) If $I=0$, the operation $R_2:=R_1*Z$ is performed;
If $I=1$, the operation $R_2:=R_2*Z$ is performed;
e) if $Y(i)=0$, then I is kept unchanged and if $Y(i)=1$, then I is complemented.

Thus, whatever the value of Y, an SQU operation and an MUL operation are always performed. There will therefore be, at step c, the following signature: S(SQU).

At step d there will be one of the following two signatures: $S(R_1=MUL (R_2, Z))$ or $S(R_2=MUL (R_1, Z))$. The signatures of step d are equivalent since they use the same operands and perform the same operation (MUL).

Consequently it is no longer possible to go back to the value Y, which will be a succession of operations (SQU) and (MUL). The application of the present invention makes it possible to calculate a modular exponentiation in a protected fashion in an electronic component using a public key algorithm requiring a modular exponentiation algorithm.

As an example of the invention, the DSA is used, which is a variant of the Schnorr and El Gamal signatures algorithm.

To sign the message m, the following steps are performed:
1) Generation of a random number k;
2) Calculation of $r=(g^k \bmod p) \bmod q$ with g, p and q public integer numbers known to the world outside the chip card;
3) Calculation of $s=(K^{-1}(H(m)+x*r)) \bmod q$ with H() a hashing function and x a private key.

The pair (r,s) corresponds to the signature of the message m.

It will noted that K is secret.

Step 2 consists partly of a modular exponentiation:

r'=$g^k$modp and r=r'modq.

If the modular exponentiation is effected with the conventional algorithm A or B as described above, then an SPA attack makes it possible to go back to the value k. Knowing k and since s, m and r are known, the attacker can calculate the secret key x. Thus he has found the key of the signature and the system is broken. It is therefore preferable to use the present invention or its variant embodiment in order to effect the modular exponentiation of step 2 of the present example.

Thus, in the present invention, since the method of calculating the algorithm does not make it possible to find k by studying the current consumption, the attacker cannot go back to the value of the private key x.

The invention claimed is:

1. A method for protecting from attack a modular exponentiation algorithm that is performed in a cryptographic operation on data in a microprocessor-based system, said algorithm being defined by the following mathematical formula:

$R=X^Y \bmod N$;

Y being an exponent having a size of k bits,
N being a modulus having a size of k' bits,
X being a known variable having a size of k" bits, and
R being the result of the modular exponentiation operation and having a size of k' bits;
Said method comprising the steps of establishing registers R1 and R2 and an indicator I in said system, and said cryptographic operation on the data including execution of the following steps via a microprocessor:
a) initializing $R_1=1$ and $Z=X$;
b) initializing $I=0$;
for each bit of Y(i) of the binary representation of Y, i varying from "0" to "k−1", performing the following steps c, d, and e from the least significant bit Y(0) to the most significant bit Y(k−1):
c) performing the operation $Z:=Z^2$;
d) if $I=0$, performing the operation $R_2:=R_1*Z$;
if $I=1$, performing the operation $R_1:=R_2*Z$;
e) if $Y(i)=0$, then I is kept unchanged and if $Y(i)=1$, then I is complemented; and
f) encrypting, decrypting, or signing said data using the value Y as a key.

2. A method for protecting from attack a modular exponentiation algorithm that is performed in a cryptographic operation on data in a microprocessor-based system, said algorithm being defined by the following mathematical formula:

$R=X^Y \bmod N$;

Y being an exponent having a size of k bits,
N being a modulus having a size of k' bits,
X being a known variable having a size of k" bits, and
R being the result of the modular exponentiation operation and having a size of k' bits;
Said method comprising the steps of establishing registers R1 and R2 and an indicator I in said system, and said cryptographic operation on the data including execution of the following steps via a microprocessor:
a) initializing $R_1=1$;
b) initializing $I=0$;
for each bit of Y(i) of the binary representation of Y, i varying from "0" to "k−1", performing the following steps c, d, e and f from the least significant bit Y(0) to the most significant bit Y(k−1):
c) if $I=0$, performing the operation $R_2:=(R_1)^2$;
if $I=1$, performing the operation $R_1:=(R_2)^2$;
d) complementing I so that it changes value from "0" to "1" or from "1" to "0";
e) if $I=0$, performing the operation $R_2:=R_1*X$;
if $I=1$, performing the operation $R_1:=R_2*X$;
f) if Y(i) is equal to 1, then I is complemented; if Y(i) is equal to 0, then I is kept unchanged; and
g) encrypting, decryrpting, or signing said data using the value Y as a key.

3. An electronic component that executes a cryptographic operation on data that includes the modular exponentiation algorithm:

$R=X^Y \bmod N$;

Y being an exponent having a size of k bits,
N being a modulus having a size of k' bits,
X being a known variable having a size of k" bits, and
R being the result of the modular exponentiation operation and having a size of k' bits;
said component including a program that executes the following steps:
establishing registers R1 and R2 and an indicator I;

a) initializing $R_1=1$ and $Z=X$;
b) initializing $I=0$;
for each bit of $Y(i)$ of the binary representation of Y, i varying from "0" to "k−1", performing the following steps c, d, and e from the least significant bit $Y(0)$ to the most significant bit $Y(k−1)$:
c) performing the operation $Z:=Z^2$;
d) if $I=0$, performing the operation $R_2:=R_1*Z$;
if $I=1$, performing the operation $R_1:=R_2*Z$;
e) if $Y(i)=0$, then I is kept unchanged and if $Y(i)=1$, then I is complemented; and
f) encrypting, decrypting, or signing said data using the value Y as a key.

4. An electronic component according to claim 3, wherein said component is a portable chip card.

5. An electronic terminal that executes a cryptographic operation on data that includes the modular exponentiation algorithm:

$$R=X^Y \bmod N;$$

Y being an exponent having a size of k bits,
N being a modulus having a size of k' bits,
X being a known variable having a size of k" bits, and
R being the result of the modular exponentiation operation and having a size of k' bits;
said terminal including a program that executes the following steps:
establishing registers R1 and R2 and an indicator I;
a) initializing $R_1=1$ and $Z=X$;
b) initializing $I=0$;
for each bit of $Y(i)$ of the binary representation of Y, i varying from "0" to "k−1", performing the following steps c, d, and e from the least significant bit $Y(0)$ to the most significant bit $Y(k−1)$:
c) performing the operation $Z:=Z^2$;
d) if $I=0$, performing the operation $R_2:=R_1*Z$;
if $I=1$, performing the operation $R_1:=R_2*Z$;
e) if $Y(i)=0$, then I is kept unchanged and if $Y(i)=1$, then I is complemented; and
f) encrypting, decrypting, or signing said data using the value Y as a key.

6. An electronic component that executes a cryptographic operation on data that includes the modular exponentiation algorithm:

$$R=X^Y \bmod N;$$

Y being an exponent having a size of k bits,
N being a modulus having a size of k' bits,
X being a known variable having a size of k" bits, and
R being the result of the modular exponentiation operation and having a size of k' bits;
said component including a program that executes the following steps:
establishing registers R1 and R2 and an indicator I;
a) initializing $R_1=1$;
b) initializing $I=0$;
for each bit of $Y(i)$ of the binary representation of Y, i varying from "0" to "k−1", performing the following steps c, d, e and f from the least significant bit $Y(0)$ to the most significant bit $Y(k−1)$:
c) if $I=0$, performing the operation $R_2=(R_1)^2$;
if $I=1$ performing the operation $R_1=(R_2)^2$;
d) complementing I so that it changes value from "0" to "1" or from "1" to "0";
e) if $I=0$, performing the operation $R_2=R_1*X$;
if $I=1$, performing the operation $R_1=R_2*X$;
f) if $Y(i)$ is equal to 1, then I is complemented; if $Y(i)$ is equal to 0, then I is kept unchanged; and
g) encrypting, decrypting, or signing said data using the value Y as a key.

7. An electronic component according to claim 6, wherein said component is a portable chip card.

8. An electronic terminal that executes a cryptographic operation on data that includes the modular exponentiation algorithm:

$$R=X^Y \bmod N;$$

Y being an exponent having a size of k bits,
N being a modulus having a size of k' bits,
X being a known variable having a size of k" bits, and
R being the result of the modular exponentiation operation and having a size of k' bits;
said terminal including a program that executes the following steps:
establishing registers R1 and R2 and an indicator I;
a) initializing $R_1=1$;
b) initializing $I=0$;
for each bit of $Y(i)$ of the binary representation of Y, i varying from "0" to "k−1", performing the following steps c, d, e and f from the least significant bit $Y(0)$ to the most significant bit $Y(k−1)$:
c) if $I=0$, performing the operation $R_2=(R_1)^2$;
if $I=1$, performing the operation $R_1=(R_2)^2$;
d) complementing I so that it changes value from "0" to "1" or from "1" to "0";
e) if $I=0$, performing the operation $R_2=R_1*X$;
if $I=1$, performing the operation $R_1=R_2*X$;
f) if $Y(i)$ is equal to 1, then I is complemented; if $Y(i)$ is equal to 0, then I is kept unchanged; and
g) encrypting, decrypting, or signing said data using the value Y as a key.

* * * * *